Oct. 3, 1961                    J. C. DUDDY                    3,003,015
                              BATTERY ELECTRODE
                            Filed June 25, 1958
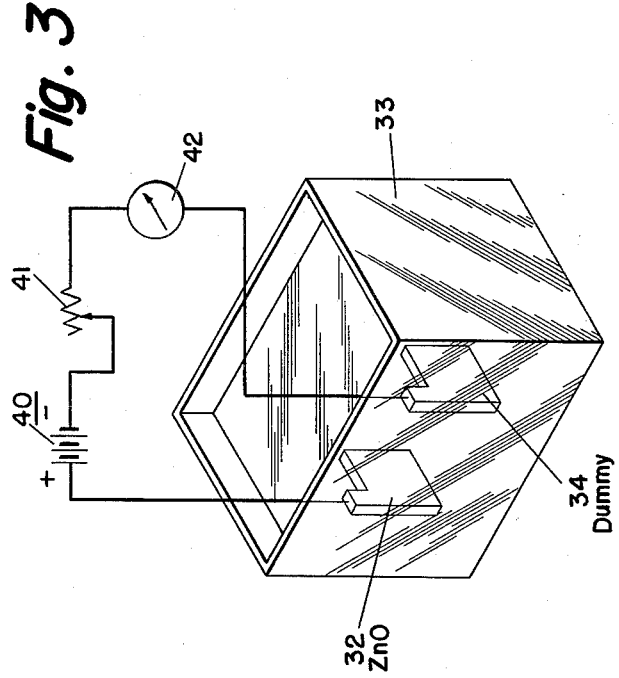
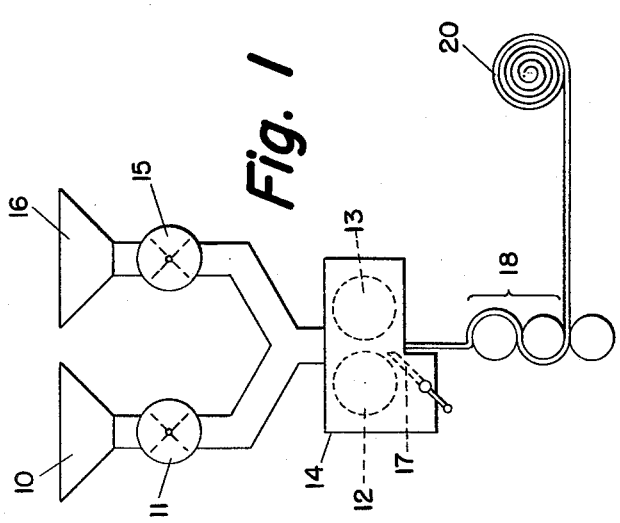
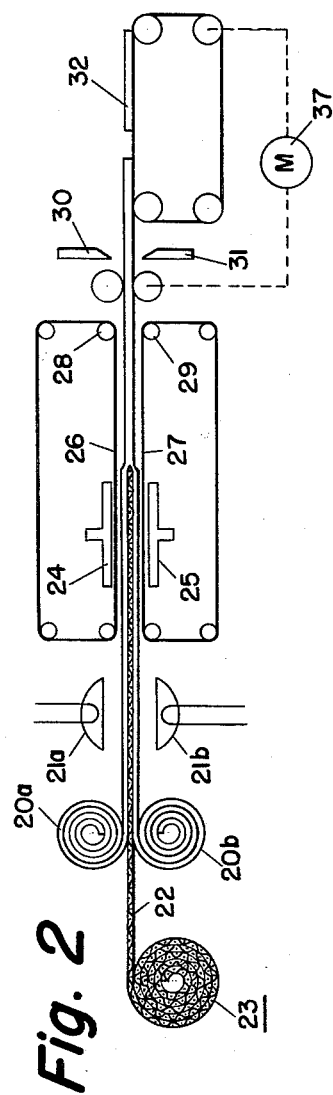

United States Patent Office 3,003,015
Patented Oct. 3, 1961

3,003,015
BATTERY ELECTRODE
Joseph C. Duddy, Trevose, Pa., assignor to The Electric Storage Battery Company, a corporation of New Jersey
Filed June 25, 1958, Ser. No. 744,544
9 Claims. (Cl. 136—30)

This invention relates to battery electrodes and to methods for producing them.

Though not limited thereto, the present invention is particularly advantageous in the production of zinc electrodes which are not only superior electrochemically to those heretofore available but which also lend themselves to continuous and hence economical production. Due to the properties of zinc oxide, plates having high porosity have been relatively fragile as compared to plates made with other materials such as silver. While zinc, zinc oxide, or combinations thereof may be sintered to provide a handleable structure, in certain instances, such as those characterized by the presence of additives of a volatile or noxious nature, it is desirable to provide structurization by other means. In addition, the coefficient of thermal expansion of the sintered structure differs sufficiently from that of the metallic grid which is normally present so as to inhibit the development of the strength inherent in the sintering processs. Still further, because porous zinc oxide is appreciably soluble in alkaline electrolytes, a structure derived by sintering is not immune to physical disintegration during electrochemical reduction to the metallic state. In the past, structurization has been accomplished by pressing at the expense of porosity and by the inclusion of inorganic binders which, in general, leave much to be desired.

As will be explained in detail hereinafter, the present invention has a number of new and novel features of general applicability. These are particularly useful in conjunction with the discovery of methods of producing zinc electrodes which because of uniformity of structurization and associated porosity of the zinc are greatly superior to zinc electrodes heretofore known to those skilled in the art.

The electrodes produced in accordance with the present invention consist of metallic particles of impalpable fineness disposed as a coherent deposit to yield a product having high porosity and adequate strength and handleability for assembly into batteries. Zinc particles are caused to cohere together, i.e., to form a porous structurized electrode, by a phenomenon not thoroughly understood but which demonstrably arises from the electrochemical reduction while the particles of zinc oxide are immobilized in the correct state of uniform disposition throughout a temporary thermoplastic matrix which is thereafter dissolved in a solvent and thereby substantially removed. The thermoplastic matrix maintains the zinc oxide particles in more or less uniform spacing throughout the mass not only to enhance their coherence, but also for the efficient and rapid electro-chemical conversion to the metallic form.

Further in accordance with the present invention, the thermoplastic binder is a water soluble hydrocarbon. More particularly, it comprises one of the water soluble resins, as for example, one of the polyethyl ether structures, available on the market under the trademark "Polyox" and referred to as a high molecular weight polymer of ethylene oxide. Another suitable resin is that available from the same company under the designation "Polyox" Coagulant which is a different grade of high molecular weight polymer of ethylene oxide. Still another suitable resin is polyethylene glycol available under the trademark of "Carbowax."

For a more detailed explanation of how to produce the battery electrodes of the present invention and how to practice the methods thereof, reference is to be had to the following description taken in conjunction with the accompanying drawings, in which:

FIG. 1 schematically illustrates the mixing and sheeting operations;

FIG. 2 schematically illustrates the electrode-assembly operations; and

FIG. 3 schematically illustrates the final structurizing and conversion operations.

Referring to FIG. 1, a water soluble resin having the properties needed for mixing, calendering, extrusion, and the like, flows from a supply bin 10 by way of a measuring valve 11 to a mixing device 14 which device is at elevated temperature. The device 14 may be a mixer of the intensive or Banbury type, or as shown, two rollers 12 and 13 operated at different speeds for plasticizing the resin may be used. The rollers 12 and 13 may be heated in any suitable manner as by steam and preferably to a temperature from about 220° F. to about 250° F.

After the plasticization has been completed, there is supplied to the mixing device 14, as by way of a measuring valve 15 from a supply bin 16, finely divided zinc oxide of high purity and impalpable fineness. The measuring valves 11 and 15 comprise metering devices for the control of the ratio of the resin in respect to that of the zinc oxide. Though not considered as critical limitations, it has nevertheless been found that the zinc oxide in proportions of at least four parts by weight, or preferably 5 to 7 parts by weight to 1 part of the polyethyl ether resin (Polyox WSR-35) are quite satisfactory.

After a time interval adequate for thorough and intimate mixing of the zinc oxide into the resin, a stripper blade 17 is moved toward one of the rollers for progressive withdrawal therefrom of the intimately mixed material. Thus it will be seen that the initial operation is essentially of the batch type. Those skilled in the art will understand that the time of mixing may vary in order to plasticize the selected water soluble resin and in particular, as between different grades of the water soluble polyethylene oxide. The plasticizing time for the Polyox WSR-35 resin is of the order of from 2 to 5 minutes. The mixing operation of the zinc oxide and the resin is of the order of 8 to 10 minutes.

The mixture of zinc oxide and the resin upon removal from the mixer 14 is fed to a sheeting device 18 shown as a series of calendering rolls operated at elevated temperature as, for example, between about 200° F. and 220° F. The calendering rolls may be set to produce a sheet of any desired thickness, for example, as thin as about, or upwardly of, one mil. If desired, the process from the calendering rolls on may be continuous though in FIG. 1 the sheet material is wound upon itself, or preferably upon a mandrel or core preparatory to the next operation. The sheet material illustrated as comprising the roll 20 may itself be pressed into a battery grid, preferably of silver, either of the screen or the expanded metal type, or of other configuration. Preferably, however, two rolls of sheet material, such as 20a and 20b, FIG. 2, form a supply of sheet material for the production of battery electrodes which include a grid. The sheet material from the rolls 20a and 20b is elevated in temperature by heating means shown as radiant lamps 21a and 21b to a temperature which may be between 240° F. and 275° F. The operation may be continuous or intermittent. When intermittent, the grid 22 from supply roll 23 together with the sheet material will be moved step-wise or by predetermined amounts.

With each movement, a pair of platens 24 and 25 are reciprocated to press between them the sheet material which by reason of softening due to the heating, at the location of lamps 21a and 21b, are pressed into the grid structure. Their meeting surfaces within the interstices of the grid 22 bond together. A pressure of the order of 300 pounds per square inch developed between the platens 24 and 25 will generally be adequate. The pressure to be selected will depend upon the thickness of each sheet of material in relation to the thickness of the grid. Preferably, the faces of the platens will be coated with a material to which the resin will not adhere. Cellophane is an example of such material and as illustrated, endless belts 26 and 27 of cellophane have portions interposed between the platens and the sheets from rolls 20a and 20b. These belts, driven by motor 37, extend somewhat beyond the location of the platens so that the electrode assembly has time to cool before reaching the rollers 28 and 29 which serve to strip the cellophane from the surface of the electrode assembly.

It is to be understood that one sheet of the mixture may be pressed into a single grid in the above manner, and that two or more grids may be utilized with three or more sheets of the mixture.

From the electrode assembly there are severed the battery electrodes 32 as by shears 30 and 31. Pattern-forming or blanking dies will ordinarily be utilized to cut from the assembly electrodes of any selected shape.

As shown in FIG. 3, each electrode, such as the electrode 32, is now placed in a forming tank 33, having also disposed therein a positive or dummy positive electrode 34. The forming tank 33 has present therein an alkaline electrolyte of high concentration, for example, a 30% potassium hydroxide solution.

Notwithstanding the presence of the resin, the electrode 32 has adequate conductivity for the flow of charging or conversion currents. While the polyethylene oxide resin is water-soluble, it is insoluble in the more concentrated alkaline electrolyte. When the electrode is immersed in the electrolyte of high concentration, a small fraction of the zinc goes into solution. As I conceive it, upon application of the conversion or charging current, the zinc ions derived from the zinc oxide dissolved in the electrolyte contained interstitially in the plate or immediately adjacent thereto, deposit or plate-out as a highly conductive feeder system which implements the subsequent and efficient conversion of the undissolved zinc oxide phase contained in the temporary but electrolyte-permeable resin binding matrix. It is for this reason that current may be supplied at initially high values for the rapid conversion of zinc oxide to zinc. From the above, it will be seen that I do not conceive that initially the particles comprising the impalpably fine zinc oxide are in optimum electrical contact with each other throughout the mass for the mixture specified. On the contrary, it is the combination of factors including the penetration of the electrolyte into the mixture, the slight solubility of the zinc in the electrolyte, and the plating-out of the zinc in the region of the particles which together contribute to the production of the final structurized mass comprising the battery electrode with the zinc particles then in optimum electrical contact.

In FIG. 3 a conventional charging circuit has been illustrated as including a direct current source 40, a rheostat 41 and an ammeter 42. Though not essential to the present invention, it is, nevertheless, highly advantageous to utilize high current densities for the conversion of zinc oxide to metallic zinc. Charging or conversion currents of the order of 0.5 to 1.0 ampere per square inch have been utilized in contrast with charging currents of the order of 0.03 ampere per square inch which have heretofore been commonly utilized.

As explained above, the zinc oxide in impalpable form is thoroughly dispersed through the resin. This resin not only serves to properly dispose the particles but also to serve as a temporary supporting matrix during the electrochemical conversion operation described. While this resin matrix has a very low degree of solubility, meaning substantially insoluble, in the strong alkaline electrolyte, nevertheless it is somewhat permeable to that electrolyte as well as to oxygen. This permits the necessary ionic movement or diffusion which facilitates the rapid conversion of the zinc oxide particles to zinc.

After the zinc oxide has been completely converted electrochemically to metallic zinc (the time required being determined by the amount of zinc oxide present per plate and the magnitude of the conversion current), the plate 32 will be washed within or removed from the forming tank and placed within a washing chamber filled with a suitable solvent which in general will be water or an aqueous solution in which said resin has a high degree of solubility. As the concentration of alkali gradually lessens within the plate 32 by virtue of the washing operation, the resin takes on the form of a slightly viscous gel. This occurs when the alkaline concentration within the electrode pores approaches a value of about 7%. The resin exudes from the plate and as the concentration of the alkali decreases below 7%, the exudation rate increases and the mobility of the exudate decreases. The gradually changing character of the resin as it dissolves from the electrode 32 appears to purge from the electrode any foreign metal particles which may have formed surface-wise thereon from impurities during the electrolytic conversion of the zinc oxide to zinc. This action is due to the flocculating and coagulating characteristic of the polyethylene oxide resin which is currently in commercial use as coagulating and flocculating agents in ore processing systems. This flocculating or coagulating action provides a charged zinc electrode of a higher degree of purity, an objective long sought for but rarely attained. The presence of impurities, as is well known, produces self-discharge and gassing. Such impurities are disadvantageous in the battery.

The washing operation is continued until substantially all of the resin has been removed, though it is to be understood that under some conditions it will be desirable to terminate the washing leaving a predetermined quantity of resinous residue as a coating to function as an oxidation inhibitor during the final drying of the plate and in the finished plates functions to minimize self-discharge. The washed electrode 32 is dried in the usual manner. It may be subjected to final pressing or corrugating operations. A relatively light pressing operation, as for example with a pressure not exceeding about 300 pounds per square inch, will produce a somewhat stronger plate without material loss of porosity.

As a further example, electrodes embodying the invention have been made utilizing 5 parts by weight of zinc oxide to 1 part of polyethylene oxide, and to which there is added about 1% by weight of impalpable yellow mercuric oxide, based on the weight of zinc oxide. Such a plate having a total area, one side, of 35 square inches was formed with a charging current initially at 23 amperes. After 38 minutes, the charging rate was decreased to 12 amperes; after 10 minutes, it was decreased to 4½ amperes; and the charge continued for another 25 minutes. The plate was then washed, corrugated, rinsed and air-dried. The addition of a small percentage (of the order of one percent and generally below ten percent) of mercuric oxide is desirable in zinc electrodes in order to reduce self-discharge in the final battery application. The present invention lends itself to the addition of mercuric oxide during the blending process to the zinc oxide and the resin. In the electrochemical reduction of the zinc oxide to its metallic state the mercuric oxide, distributed uniformly through the mixture is reduced to its metallic state and amalgamates with the particles of zinc. Plates made as just described were found to have satisfactory electrical efficiencies.

As earlier indicated, the present process is not limited to zinc oxide. It is equally applicable to silver oxide, cadmium oxide, as well as to oxides of iron, copper and lead. With powdered lead oxide as the starting material, the conversion of the lead oxide to metallic lead will be in a high concentration of an acidic medium. The resin is relatively insoluble in strong acids. The changing solubility during the washing process produces the same scouring of the electrode to purge therefrom foreign particles of metal.

By the controlled exudation of the water-soluble resin which takes place in the washing bath, the highly active metallic zinc is at all times protected from oxidation. By terminating the resin removal or exudation step short of complete removal of the resin, the zinc electrode is provided with a resin coating which is itself resistant to oxidation and which protects the metallic zinc from oxidation by exposure to the atmosphere. It is well understood by those skilled in the art that electrochemically active metallic zinc has such a high degree of activity that it rapidly oxidizes when exposed to the air which means corresponding loss in battery capacity, especially in primary battery applications. By the controlled removal of the resin, oxidation-resistant negative electrodes are made available with an electrolyte-permeable coating. That coating being inert to the electrolyte and to the battery reactions is not harmful to the subsequent battery operations. The major portion will in any event be removed, and in general only a slight residue thereof need be left on the faces of each electrode to provide the desired degree of oxidation-resistant characteristic.

What is claimed is:

1. The method of making battery electrodes which comprises intimately and thoroughly mixing with an electrolytically reducible metallic compound selected from the hereinafter named group of metallic compounds a plasticized resin substantially insoluble in an electrolyte and soluble in a solution in which the metal of said selected metal compound is to major degree insoluble, said metallic compound being selected from the group consisting of zinc oxide, copper oxide, silver oxide, lead oxide, iron oxide and cadmium oxide, electrolytically reducing said compound in said electrolyte to produce throughout said mixture finely divided metal, said metal compound being present in ratio of at least 4 to 1 by weight with respect to said resin, and subjecting said mixture to a solvent for removal of at least the major portion of said resin to yield a porous structurized mass.

2. The method of making battery electrodes which comprises intimately and thoroughly mixing an electrolytically reducible metallic compound selected from the hereinafter named group of compounds with a plasticized resin substantially insoluble in an electrolyte of high concentration and soluble in aqueous solutions of low concentration, said metallic compound being selected from the group consisting of zinc oxide, iron oxide, cadmium oxide, copper oxide and silver oxide, shaping said mixture in the form of a battery electrode, electrolytically reducing said compound in said electrolyte to produce throughout said mixture finely divided electrochemically active metal, said metal compound being present in proportions of at least 4 parts by weight with respect to one part of said resin, and subjecting said mixture to a solvent in which said metal compound is insoluble for removal of at least the major portion of said resin to yield a porous electrode of structurized electrochemically active material, said resin being selected from the group consisting of polyethylene oxide and polyethylene glycol.

3. The method of making battery electrodes which comprises intimately and thoroughly mixing with zinc oxide a plasticized mass of polyethylene oxide resin in ratio of from about 5 parts to about 7 parts of zinc oxide to one part by weight of said polyethylene oxide resin, sheeting said mixture to a selected thickness, separating from the sheeted mixture desired electrode shapes, electrolytically reducing said zinc oxide in an alkaline electrolyte of high concentration in which said polyethylene oxide resin is substantially insoluble to produce throughout the electrode finely divided electrochemically active zinc, and subjecting said mixture of metallic zinc and polyethylene oxide resin to a solvent for removal of at least the major portion of said polyethylene oxide resin, the electrode then consisting of porous structurized electrochemically active zinc.

4. The method of claim 3 in which mercuric oxide as an additive below about 10% is introduced in said mixing step.

5. The method of making battery electrodes which comprises intimately and thoroughly mixing with zinc oxide a plasticized mass of polyethylene oxide resin in ratio of from about 5 parts to about 7 parts of zinc oxide to one part by weight of said polyethylene oxide resin, sheeting said mixture to a selected thickness, pressing said sheet into a supporting grid, electrolytically reducing said zinc oxide in an alkaline electrolyte of high concentration in which said polyethylene oxide resin is substantially insoluble to produce throughout the electrode finely divided electrochemically active zinc, subjecting said mixture of metallic zinc and polyethylene oxide resin to a solvent in which said zinc is insoluble for removal of at least the major portion of said polyethylene oxide resin, the electrode then consisting of porous structurized electrochemically active zinc.

6. A method of making a zinc electrode which comprises uniformly dispersing finely divided zinc oxide particles throughout a water-soluble plasticized resin, said zinc oxide being present in a ratio of at least 4 to 1 parts by weight with respect to said resin and said resin being present in amount sufficient to structurize said zinc oxide particles, shaping said mixture into an electrode, electrochemically converting said zinc oxide to metallic zinc in an alkaline electrolyte in which said resin has a low degree of solubility, and thereafter washing said electrode with an aqueous solution in which the resin has a high degree of solubility and in which said zinc is insoluble to remove therefrom substantially all of said water-soluble resin.

7. The method of claim 6 wherein the water-soluble thermoplastic resin is polyethylene oxide.

8. The method of claim 6 wherein the water-soluble thermoplastic resin is polyethyl glycol.

9. A battery electrode made according to the method of claim 1.

References Cited in the file of this patent

UNITED STATES PATENTS

| 347,754 | Woodward | Aug. 17, 1886 |
|---|---|---|
| 422,308 | Lyte | Feb. 25, 1890 |
| 1,139,213 | Morrison | May 11, 1915 |
| 2,681,375 | Vogt | June 15, 1954 |
| 2,684,989 | Wilburn | July 27, 1954 |
| 2,811,572 | Fischbach et al. | Oct. 29, 1957 |
| 2,838,590 | Garine | June 10, 1958 |

FOREIGN PATENTS

| 751,320 | Great Britain | June 27, 1956 |